Patented Nov. 7, 1922.

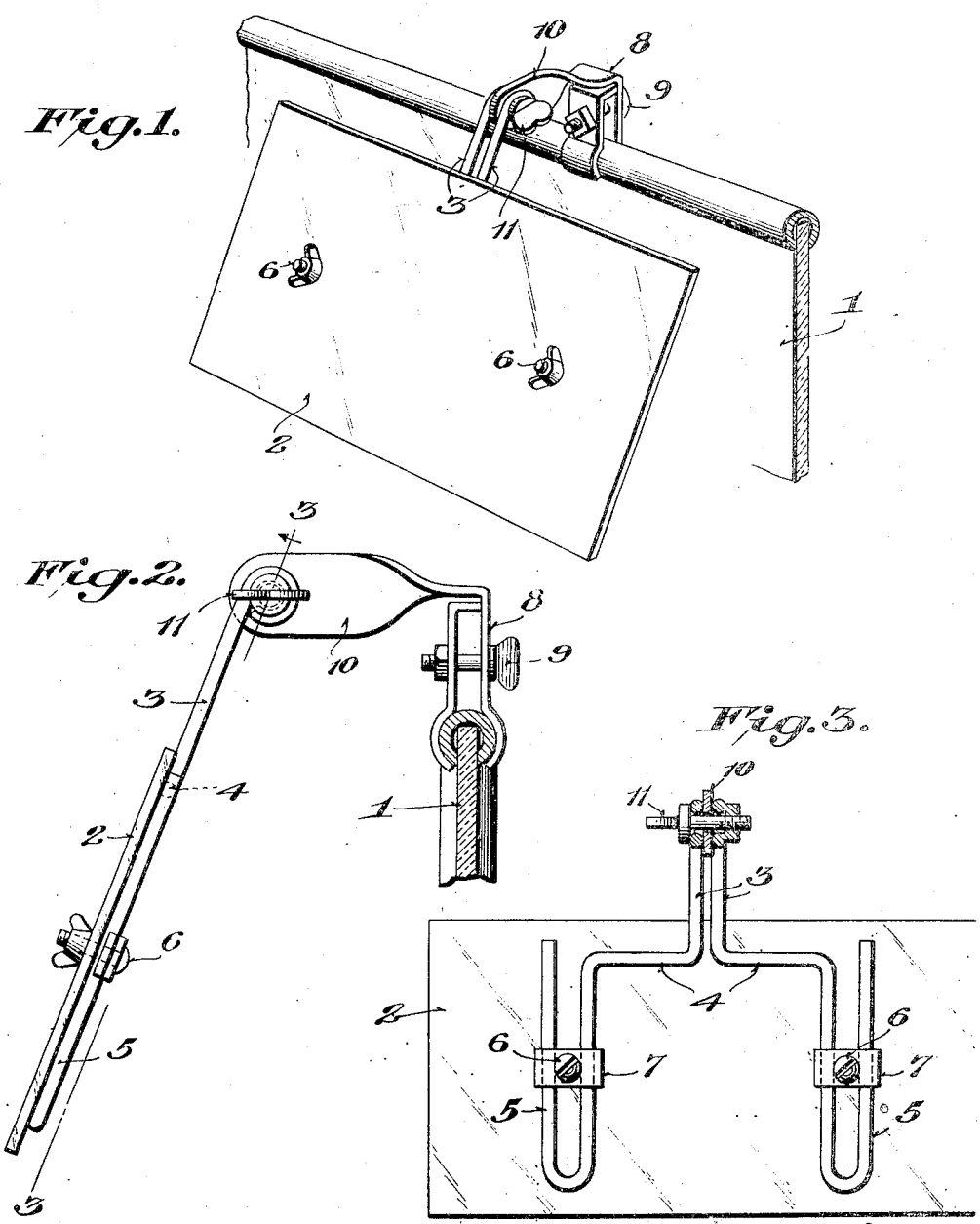

1,434,750

UNITED STATES PATENT OFFICE.

ROBERT PRATT, OF ARMINGTON, ILLINOIS.

GLARE EXTINGUISHER.

Application filed February 1, 1922. Serial No. 533,239.

*To all whom it may concern:*

Be it known that I, ROBERT PRATT, a citizen of the United States of America, residing at Armington, in the county of Tazewell and State of Illinois, have invented certain new and useful Improvements in Glare Extinguishers, of which the following is a specification, reference being had therein to the accompanying drawing.

This invention relates to improvements in glare extinguishers, and is designed for use, chiefly, on vehicles, and especially on motor vehicles, and has for its chief object the dimming of the glare from the lights of approaching cars, as well as the glare from the sun.

This invention has particular reference to that class of glare extinguishers that are positioned within the cars at the inside of the wind-shield, the objects being to enable the operator of the car to raise or lower the glare extinguishing glass, to shift its position along the wind-shield, or to swing it up towards the top of the car and out of the way, without leaving the car or his seat.

With these and other objects in view, as will appear in the description following, the invention consists in the improved construction and novel arrangement and combination of the several parts of the device hereinafter described, illustrated in the accompanying drawing, and more particularly pointed out in the claims hereunto appended.

In the accompanying drawing:

Figure 1 is a perspective view of my improved glare extinguished, and Fig. 2 a sectional view showing my improved device attached to the top of the wind-shield of a car, at the inside thereof, to the front of the operator, and ready for use, and Fig. 3 is a view showing the form and construction of the glass holding bracket, and means for holding the glass adjustably thereon.

Referring to the accompanying drawing by numerals, 1 indicates the wind-shield of a motor vehicle, and 2 a glare-extinguishing glass of any desired size or shape, and of any suitable color, preferably green. The numeral 3 indicates the glass holding bracket, formed, preferably, from stiff wire, and comprising two oppositely disposed diverging arms 4, 4, the free end portions of which are turned, as shown, to provide U-shape supports 5 against which the glass 2 rests and to which it is adjustably secured by clamping screws 6, 6, adapted to pass through suitable openings in said glass and to engage the clamping plates 7, 7, resting against said U-shape supports. This form of construction enables the operator of the car to adjust the glass to any desired height on said bracket 3 without leaving his seat, and at the same time affords a reliable and easily manipulated clamping means, as is apparent.

The numeral 8 indicates a clamping device for attaching, slidably, the glass holding bracket 3 to the top of the wind-shield by means of the set screw 9, and has its longer arm 10 turned, preferably, at right angle, and to which arm the said bracket 3 is adjustably hinged by means of the clamping screw 11, as shown.

The device is usually attached to the top of the wind-shield, to the inside thereof, just in front of the operator of the car, and the glass is adjusted to the proper height for such operator through the adjusting clamping-means 6, 6, 7, 7, and is then ready for use. This adjustable feature of the device adapts its use to all heights of cars and all heights of operators. When the use of the glass is not desired, the clamping screw 11 is loosened and the glass swung up towards the top of the car and out of the way, and is securely held in that position by the tightening of the clamping screw 11, as is evident. When it is desired to use the glass the screw 11 is loosened and the glass lowered to position when the screw 11 is again tightened. When desired the glass may be shifted along the wind-shield by loosening the clamping screw 9, pushing the device to the desired point, and tightening up said screw, as is evident. All of these manipulations of the device may be quickly and easily performed by any person in the front seat of the car, without leaving the car, or the seat.

Having thus described my invention, what I claim is:

1. In a glare extinguisher of the character described, a glass supporting bracket comprising two oppositely disposed diverging arms the free end portions of which are turned to form U-shape supports against which the glass rests, a colored glare-extinguishing glass, clamps for adjustably holding said glass to said bracket and permitting adjustment of the same relative thereto, and means for holding said glass and bracket in position for use, and permitting the same to be swung up out of the way towards the top of the car and holding the same securely in such position.

2. In a glare extinguisher of the character described, a glass supporting bracket comprising two oppositely disposed diverging arms the free end portions of which are turned to form U-shape supports against which the glass rests, a colored glare-extinguishing glass, clamps comprising screws adapted to pass through suitable openings in said glass and engaging clamping plates resting against said U-shape supports for adjustably holding said glass to said bracket and permitting the adjustment of the same relative thereto, and means for holding said glass and bracket in position for use, and permitting the same to be swung up out of the way towards the top of the car and holding the same securely in such position.

3. A glare extinguisher of the character described comprising clamping means for adjustably attaching it to the wind shield of a motor car, said clamping means having one of its arms turned at an angle, a glass supporting bracket hinged to said arm and adjustably clamped thereto, comprising two oppositely disposed diverging arms the free end portions of which are turned to form U-shape supports against which the glass rests, a colored glare-extinguishing glass, clamps comprising screws adapted to pass through suitable openings in said glass and engaging clamping plates resting against said U-shape supports for adjustably holding said glass to said bracket and permitting the adjustment of the same relative thereto, and means for holding said glass and bracket in position for use, and permitting the same to be swung up out of the way towards the top of the car, when its use is not desired, and holding the same securely in such position.

In testimony whereof I hereunto affix my signature in the presence of two witnesses.

ROBERT PRATT.

Witnesses:
 GROVER FISHER,
 OWEN E. PRATT.